United States Patent
Tapse

(10) Patent No.: US 10,694,248 B2
(45) Date of Patent: Jun. 23, 2020

(54) METHODS AND APPARATUS TO INCREASE A MATCH RATE FOR MEDIA IDENTIFICATION

(71) Applicant: The Nielsen Company (US), LLC, New York, NY (US)

(72) Inventor: Sandeep Tapse, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/006,822

(22) Filed: Jun. 12, 2018

(65) Prior Publication Data

US 2019/0379933 A1    Dec. 12, 2019

(51) Int. Cl.
| | |
|---|---|
| *H04N 21/442* | (2011.01) |
| *H04N 21/858* | (2011.01) |
| *H04N 21/435* | (2011.01) |
| *H04N 21/44* | (2011.01) |
| *H04N 21/235* | (2011.01) |

(52) U.S. Cl.
CPC ... *H04N 21/44204* (2013.01); *H04N 21/2353* (2013.01); *H04N 21/435* (2013.01); *H04N 21/44008* (2013.01); *H04N 21/8586* (2013.01)

(58) Field of Classification Search
CPC .......... H04N 21/2353; H04N 21/2408; H04N 21/44008; H04N 21/442; H04N 21/44204; H04N 21/435; H04N 21/84; H04N 21/8586
See application file for complete search history.

(56) References Cited

U.S. PATENT DOCUMENTS

| | | | |
|---|---|---|---|
| 7,793,318 B2 * | 9/2010 | Deng | H04N 21/44008 725/19 |
| 8,768,757 B2 | 7/2014 | Antonov et al. | |
| 8,838,978 B2 | 9/2014 | Winograd et al. | |
| 8,918,330 B1 * | 12/2014 | Winkler | H04N 21/2743 705/14.16 |
| 8,943,528 B1 | 1/2015 | Rowe | |
| 9,301,019 B1 | 3/2016 | Atrini et al. | |
| 9,307,337 B2 | 4/2016 | Fonseca, Jr. et al. | |
| 9,402,111 B2 | 7/2016 | Muller et al. | |
| 9,419,973 B2 | 8/2016 | Oyman | |
| 9,531,993 B1 | 12/2016 | Wiseman | |
| 9,813,404 B2 | 11/2017 | Oyman | |
| 10,142,382 B1 * | 11/2018 | Arini | H04L 65/4069 |

(Continued)

*Primary Examiner* — Pankaj Kumar
*Assistant Examiner* — Alexander Boyd
(74) *Attorney, Agent, or Firm* — Hanley, Flight & Zimmerman, LLC

(57) ABSTRACT

Methods and apparatus are disclosed herein that increase a match rate for over-the-top media. An example apparatus includes a signature generator to generate a first signature of a first portion of a first media element and an audience measurement interface to receive a second signature of media monitored by a panelist meter. The example apparatus further includes a media element analyzer to compare the first signature and the second signature, determine a number of hits associated with the first media element based on the comparison, and, when the number of hits meets a threshold, generate a third signature of the first media element, the third signature generated for a second portion of the first media element, the second portion greater than the first portion.

19 Claims, 6 Drawing Sheets

(56) References Cited

U.S. PATENT DOCUMENTS

| | | | |
|---|---|---|---|
| 2002/0082837 A1* | 6/2002 | Pitman | H04N 21/4394 704/270.1 |
| 2006/0248569 A1* | 11/2006 | Lienhart | H04N 21/44008 725/135 |
| 2011/0320715 A1 | 12/2011 | Ickman et al. | |
| 2012/0117584 A1* | 5/2012 | Gordon | H04N 21/4722 725/19 |
| 2013/0261781 A1 | 10/2013 | Topchy et al. | |
| 2014/0150001 A1* | 5/2014 | McMillan | H04N 21/44213 725/9 |
| 2014/0277640 A1* | 9/2014 | Bilobrov | G10L 25/54 700/94 |
| 2015/0163545 A1* | 6/2015 | Freed | H04N 21/44008 725/19 |
| 2016/0225002 A1 | 8/2016 | Splaine et al. | |
| 2016/0337695 A1 | 11/2016 | Muller et al. | |
| 2017/0262454 A1 | 9/2017 | Raichelgauz et al. | |
| 2017/0288987 A1* | 10/2017 | Pasupathy | H04L 43/028 |

* cited by examiner

METHODS AND APPARATUS TO INCREASE A MATCH RATE FOR MEDIA IDENTIFICATION

FIELD OF THE DISCLOSURE

This disclosure relates generally to media monitoring, and, more particularly, to methods and apparatus to increase a match rate of media identification.

BACKGROUND

In recent years, over-the-top (OTT) media (e.g., Youtube® videos, Netflix® streaming, etc.) has become a primary source for media in some user households. OTT media is streaming media delivered over the Internet without a multiple-system operator being involved in the control and/or distribution of the media. Because OTT media is being consumed at an ever-increasing rate, there is a greater need to monitor the OTT media that is being watched by consumers.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
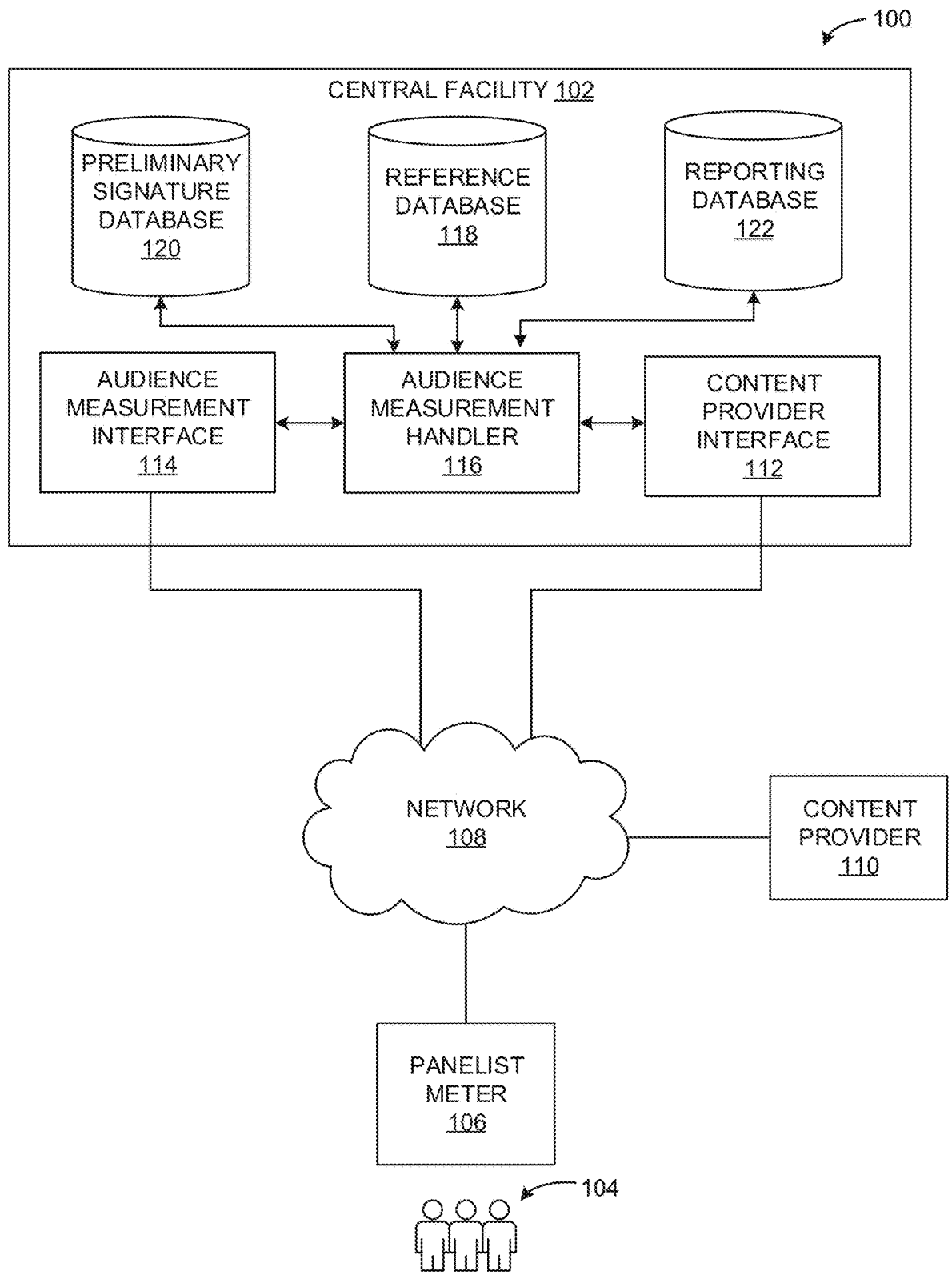
FIG. 1 is a schematic illustration of an example environment constructed in accordance with the teachings of this disclosure to monitor media.

Examples disclosed herein are directed to increasing the match rate of media identification. For example, methods and apparatus disclosed herein may be used to increase matching with over-the-top (OTT) media. OTT refers to the delivery of audio, video, and/or other media over the Internet without a multiple-system operator being involved in the control and/or distribution of the media. For example, OTT media is distributed from one or more third parties to an end user through an Internet-enabled device. Alternatively, examples disclosed herein may be used with any media delivered via satellite, cable television, radio frequency (RF) terrestrial broadcast, the Internet (e.g., internet protocol television (IPTV)), television broadcasts, radio broadcasts and/or any other type(s) of transmission for delivering media.

As used herein, an impression is defined to be an event in which a home or individual is exposed to corresponding media. Thus, an impression represents a home or an individual having been exposed to media (e.g., an advertisement, content, a group of advertisements, a collection of content, etc.). In Internet media access, a quantity of impressions or impression count is the total number of times media (e.g., content, an advertisement, an advertisement campaign, etc.) has been accessed by an Internet audience.

Media may include advertising and/or content. Example types of media include web pages, text, images, streaming video, streaming audio, movies, and/or any other type of content and/or advertisements. In some examples, media includes user-generated media that is, for example, uploaded to media upload sites such as Youtube® and subsequently downloaded and/or streamed by one or more client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

Often OTT devices (e.g., Roku™ devices, Apple TV™ devices, Samsung™ TV devices, Chromecast™ devices, Amazon Fire TV™ devices, etc.) provide media (e.g., content and/or advertising) without tracking exposures (e.g., collecting impressions) to the media. When monitoring OTT media on a computer, tablet, and/or other similar panelist device, on-device meters (ODMs) easily collect monitoring information (e.g., media being consumed, a provider of the media, etc.) for a panelist. However, other types of monitoring devices, such as personal portable meters (PPMs) and on-site meters, are not implemented directly on a media device (e.g., via an application, etc.). Instead, some monitoring devices such as these detect media content by generating signatures of detected audio and comparing the generated signatures to reference signatures to determine the media content.

Signature-based media monitoring generally involves determining (e.g., generating and/or collecting) signature(s) representative of a media signal (e.g., an audio signal and/or a video signal) output by a monitored media device (e.g., a mobile device, a television, a personal computer, etc.) and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature. Because attributes, such as an identifier of the media, a presentation time, a broadcast channel, a uniform resource locator (URL), etc., are collected for the reference signature, these attributes may then be associated with the monitored media whose monitored signature matched the reference signature. Example systems for identifying media based on signatures are long known and were first disclosed in Thomas, U.S. Pat. No. 5,481,294, which is hereby incorporated by reference in its entirety.

Signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "signature" is defined herein to mean a proxy for identifying media that is generated from one or more inherent characteristics of the media.

To monitor OTT media consumption, reference signatures for OTT media must be included within the reference database. However, in some instances, OTT media is difficult to maintain within the reference database. For example, OTT media is not broadcast at predetermined times and dates and/or broadcast on predetermined channels like other types of media (e.g., television). Further, OTT media is created at a rapid pace and includes a variety of content. In some instances, OTT media distributors may not make media available for reference signature generation.

To determine what media must be included within the reference database, a comprehensive yet efficient method is required. Including too little media within the reference database reduces the accuracy and breadth of the media monitoring conducted by an audience measurement entity (AME), while including too much media within the reference database puts an unnecessary burden on the database and data storage requirements to maintain such large amounts of data.

Thus, examples disclosed herein provide improved apparatus and methods that determine media that is to be stored within a reference database for subsequent use in media monitoring conducted by the AME. Further, examples disclosed herein increase the match rate of the media being consumed by panelists because more media is added to the reference database, allowing it to be regularly monitored and/or credited.

Some examples disclosed herein include generating first signatures of portions of a media element and receiving one or more second signatures from monitored media elements. The examples further include comparing the one or more second signatures with the first signature, determining a number of impressions associated with the first media element based on the comparison, and, when the number of impressions meets a threshold, generating a third signature of the first media element, the third signature generated for the entire first media element.

Some examples disclosed herein include media elements that are associated with over-the-top media. Further, in some examples disclosed herein, the portion of the first media element is the first thirty seconds of the media element. Other examples disclosed herein include identifying the media element prior to generating the first signature based on a number of views associated with the first media element on a host website. In some such examples, the first media element is identified by a web crawler.

Some examples disclosed herein include storing the second signature in a reference database as a reference signature. The reference signatures stored in the reference database are used to determine a number of impressions associated with monitored media elements. Some other examples include determining a hit associated with the media element by detecting when one of the second signatures matches the first signature. In some such examples, a match is detected based on a Hamming distance or a cross-correlation value.

FIG. 1 is a schematic illustration of an example environment 100 constructed in accordance with the teachings of this disclosure to monitor over-the-top media. The illustrated example includes a central facility 102 to receive media monitoring information (e.g., signatures, uniform resource locators (URLs), media titles, etc.) from panelists 104 regarding media (e.g., advertisements, over-the-top (OTT) media, etc.) consumed by the example panelists 104. The example central facility 102 is communicatively coupled to example panelist meter 106 via an example network 108. In some examples, the panelist meter 106 is an on-site meter that collects and/or generates signatures of detected audio from the media being consumed by the panelist. In such an example, the signatures collected and/or generated by the panelist meter 106 are transmitted to the central facility 102 via a network 108 for processing. In other examples, the panelist meter 106 is a personal portable meter (PPM) that generates signatures of detected audio and/or video.

The illustrated example environment 100 further includes a content provider 110 that transmits media content (e.g., OTT media, television programs, etc.) to panelist devices used by the example panelists. For example, the content provider 110 can be an OTT provider (e.g., Hulu®, Netflix®, etc.), a television broadcast network (e.g., NBC, CBS, etc.), and/or other providers of content over the example network 108. In some examples, media content transmitted by the example content provider 110 is detected by the example panelist meter 106 when consumed by the panelists 104. Although the illustrated example of FIG. 1 includes a single example content provider 110, some other examples include multiple content providers communicatively coupled to the example central facility 102 and/or provided to the example panelists 104 via the example network 108.

The media content provided by the example content provider 110 is additionally transmitted to the example central facility 102. The central facility 102 receives the media content at an example content provider interface 112. In the illustrated example, the example central facility 102 includes an example audience measurement handler 116, which generates reference signatures for the media elements received at the example audience measurement interface 114. As used herein, the term "media element" refers to a singular or specific element of content and/or advertisement(s) of any type(s) (e.g., an episode of a TV show, a Youtube® video, an advertisement, etc.). The example audience measurement handler 116 stores the generated signatures in an example reference database 118. In some examples, the audience measurement handler 116 stores other information associated with the media element (e.g., a title of the media content, an identifier associated with the media content, etc.) with the generated signature. The signatures in the example reference database 118 can be used to match signatures received at the audience measurement interface 114 from the example panelist meter 106. When a signature received from the example panelist meter 106 matches a signature stored in the example reference database 118, an impression is collected for the media element. For example, the panelist meter 106 generates a signature for a media element consumed by the panelist 104 (e.g., a Youtube® video, an episode streaming through Netflix®, etc.), and transmits the generated signature to the central facility 102 via the network 108. In such an example, the audience measurement handler 116 compares the generated signature to one or more signatures stored in the reference database 118, and, when a signature stored in the reference database 118 matches the generated signatures, associates an impression with the media element in the reference database 118.

In some examples, the content provider 110 is a provider of OTT media and transmits OTT media elements to the central facility 102 via the network 108. However, it is not desirable for reference signatures to be generated by the example audience measurement handler 116 for every OTT media element because generating signatures for all OTT media would increase the storage requirements of the example reference database 118 and the example central facility 102. Therefore, it is desirable to first determine the OTT media to be stored in the example reference database 118 before generating signatures for the OTT media elements provided by the example content provider 110.

The example audience measurement handler 116 thus determines preliminary signatures for the OTT media elements provided by the example content provider 110. As used herein, the term "preliminary signature" refers to a signature collected and/or generated for a portion of a media element. In some examples, preliminary signatures are signatures generated for the first thirty seconds of the media element. In some other examples, the signatures are generated for longer or shorter portions of the media element. In some examples, the preliminary signatures are generated from multiple portions of the media element (e.g., a portion at the beginning and a portion at the end of the media, etc.).

The preliminary signatures generated by the example audience measurement handler 116 are stored in an example preliminary signature database 120. In some examples, the preliminary signatures stored in the example preliminary signature database 120 are associated with the media element from which they were generated. The example preliminary signature database 120 further includes other information associated with the media element (e.g., a title of the media element, ID associated with the media element, etc.).

When the example panelist meter 106 generates a signature and transmits the signature to the example central facility 102, the audience measurement handler 116 compares the signature to the preliminary signatures stored in the example preliminary signature database 120. In some examples, when a signature is received from the panelist meter 106, the audience measurement handler 116 compares the generated signature to the preliminary signatures stored in the preliminary signature database 120. If a match is detected, the example audience measurement handler 116 associates a hit with the media element of the generated signature. As used herein, the term "hit" refers to a match between a signature generated by a metering device (e.g., the panelist meter 106) and a preliminary signature stored in the example preliminary signature database 120. For example, a hit may correspond to a panelist viewing a media element on a monitored device. Thus, the more hits that are associated with a media element, the more it has been viewed.

In the illustrated example, the central facility 102 further includes a reporting database 122. The example reporting database 122 stores monitoring information used to generate reports. For example, the reporting database 122 stores media elements and an associated number of impressions and/or other monitoring information (e.g., demographic information associated with the impressions of the media element, characteristics associated with panelists, etc.). In some examples, a report is generated based on the content and/or information stored in the reporting database 122 and subsequently provided to a content provider (e.g., the example content provider 110) and/or another interested party.

Figure 2:
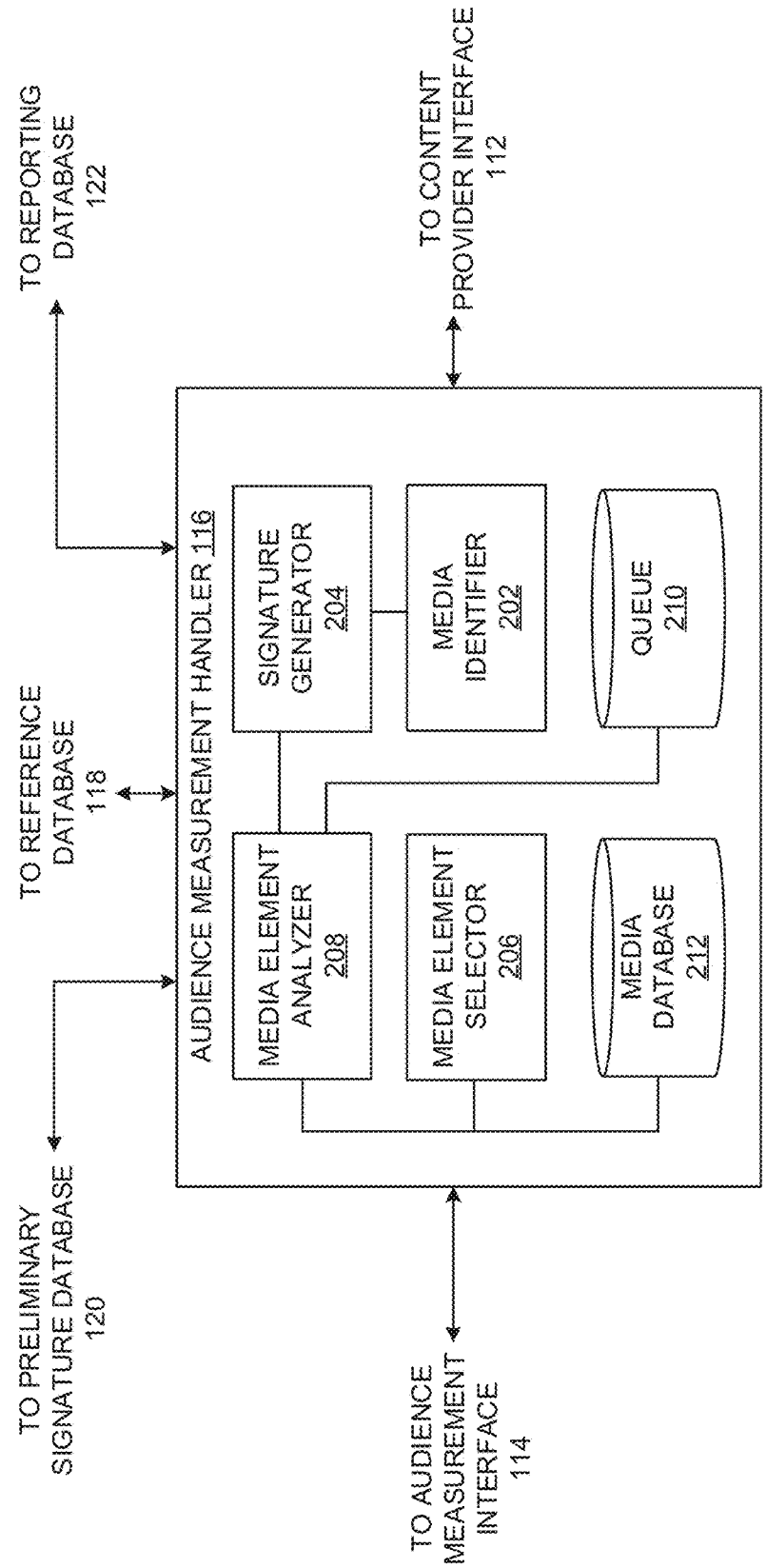
FIG. 2 is a block diagram of an example implementation of the example audience measurement handler 116 of FIG. 1.

FIG. 2 is a block diagram of an example implementation of the example audience measurement handler 116 of FIG. 1. The example audience measurement handler 116 includes an example media identifier 202, an example signature generator 204, an example media element selector 206 an example media element analyzer 208, an example queue 210, and an example media database 212.

In the illustrated example, media elements are accessed from the example content provider 110 via the example content provider interface 112 and stored in the example media database 212. For example, the content provider 110 of FIG. 1 is communicatively coupled to the content provider interface 112 via the network 108 of FIG. 1. The media content provided by the example content provider 110 of FIG. 1 is thus delivered to the audience measurement handler 116 for processing at the example central facility 102. In some examples, the content provider 110 is a provider of OTT media (e.g., Netflix®, Hulu®, etc.). In some examples, the content provider 110 provides other media content (e.g., television broadcasts) to the central facility 102.

In the illustrated example, the media identifier 202 identifies the media element or elements for which preliminary signatures are to be generated. The example media identifier 202 determines which of the media elements accessed via the content provider interface 112 are to be added to the preliminary signature database 120 of FIG. 1. In some examples, the media identifier 202 identifies media elements from a website that hosts OTT media (e.g., Youtube®, Hulu®, etc.) that are included in a most-viewed or top-ranked section. For example, the media identifier 202 can access a "trending videos" section of a website (e.g., Youtube®, Dailymotion, Vevo, etc.), remove commercials included in the media element, if necessary, and store the media element in the media database 212. In some such examples, the media identifier 202 uses a web crawler to systematically index the media included in these sections.

In some examples, the media identifier 202 identifies other types of media elements (e.g., Digital Versatile Discs (DVDs), television programs, etc.) to be included in the preliminary signature database 120. For example, the media identifier 202 can identify media from different sections of movies and/or movies in different languages. In such examples, portions (e.g., bumpers) of movies or TV shows (e.g., a famous scene in a movie) are identified by the media identifier 202. Further, some examples include identifying the same media element in multiple different languages (e.g., English, Spanish, Hindi, etc.). It is advantageous to identify these other types of media elements for which preliminary signatures are to be generated because they often include large amounts of data (e.g., because they include movies and other longer content) which requires increased storage within the reference database 118. Using the methods disclosed herein to generate preliminary signatures for this content reduces the storage requirements of the central facility 102.

The example media identifier 202 further gathers information about the media element (e.g., a title of a video, a uniform resource locator (URL) associated with the media element, etc.). For example, the media identifier 202 accesses the media element from the content provider 110 of FIG. 1 via the content provider interface 112 to determine the information about the media element. The example media identifier 202 then stores the gathered information in the example media database 212.

The example signature generator 204 of the example audience measurement handler 116 generates preliminary signatures for the media element identified by the example media identifier 202. In some examples, the preliminary signature is a signature generated for a portion of the media element (e.g., the first thirty seconds, a scene of the media element, etc.). The example signature generator 204 generates preliminary signatures using the same algorithm and/or process as the example panelist meter 106 of FIG. 1 to facilitate accurate matching between the preliminary signatures and the signatures generated by the example panelist meter 106 of FIG. 1.

The example audience measurement handler 116 is further communicatively coupled to the example preliminary signature database 120. The example preliminary signature database 120 stores preliminary signatures generated by the example signature generator 204. The example audience measurement handler 116 accesses the preliminary signatures stored on the example preliminary signature database 120 to compare them to received signatures (e.g., signatures received from the example panelist meter 106 of FIG. 1).

In the illustrated example, the example audience measurement interface 114 receives signatures of media elements collected by the example panelist meter 106 and transmits them to the example audience measurement interface 114. The example audience measurement interface 114 further stores the received signatures in the example media database 212. In some examples, the media identifier 202 continuously identifies media elements for which the example signature generator 204 generates preliminary signatures while the signatures of monitored media elements are received at the audience measurement handler 116. In other words, the processes performed by the example audience measurement handler 116 can operate either simultaneously or consecutively without changing the function of either process.

In the illustrated example, the received signatures of the monitored media elements stored in the example media database 212 are compared by the example media element analyzer 208 to those stored in the preliminary signature database 120 of FIG. 1 and/or the example reference database 118 of FIG. 1. For example, the media element analyzer 208 accesses and compares a received signature to signatures stored in the reference database 118 to determine whether the signature matches one of the signatures stored within the reference database 118. Similarly, the example media element analyzer 208 determines whether the received signature matches a preliminary signature stored in the example preliminary signature database 120. In some examples, the media element analyzer 208 operates to simultaneously query the preliminary signature database 120 and the reference database 118, while in other examples the two databases are queried consecutively and/or independently.

When the example media element analyzer 208 determines a match between a received signature and a signature stored within the reference database 118, an impression is counted by the example media element analyzer for the media element stored in the reference database 118. The impression is recorded and associated with the media element stored in the reference database 118 in addition to other information associated with the media element (e.g., a title of the media element, a URL of the media element, a unique ID associated with the media element, etc.). The media element analyzer 208 of the illustrated example continues to add to the number of impressions each time a new match is detected. If the signature of the received media element does not match any of the signatures stored in the example reference database 118, the example audience measurement handler 116 queries the preliminary signature database using the example media element analyzer 208. In other examples, the media element analyzer 208 uses other methods to identify the media element.

When the example media element analyzer 208 determines that the received signature matches a signature in the example preliminary signature database 120, the example media element analyzer 208 counts a hit associated with the media element stored in the preliminary signature database 120 (e.g., by associating the hit with a media element title, ID, URL, etc.). The example media element analyzer 208 continues to add to the number of hits associated with the media elements as more signatures are received that match preliminary signatures within the preliminary signature database 120.

In some examples, a match is not detected by the media element analyzer 208 in either the reference database 118 or the preliminary signature database 120. In such examples, alternative methods are used to determine the unidentified media element. In some examples, a URL associated with the unidentified media is determined, and information related to the media element (e.g., a title of the media element, provider of the media element, etc.) is determined by accessing the URL. In some examples, a user or administrator accesses the URL and the media element is identified manually. In other examples, the identification is an automated process performed by, for example, the media identifier 202 of the audience measurement handler 116. Further example methods and apparatus for identifying streaming media sources are disclosed in U.S. patent application Ser. No. 15/467,734, which is hereby incorporated by reference in its entirety.

In the illustrated example, the example media element selector 206 selects a media element from the example preliminary signature database 120 to be analyzed. For example, the media element analyzer 208 compares the hits associated with the selected media element stored in the preliminary signature database 120 to a threshold value to determine if an expanded signature is to be generated for the media element. As used herein, the term "expanded signature" refers to a signature that is generated for a media element having a greater duration than the preliminary signature (e.g., half of the duration of the media element, the entire duration of the media element, etc.). The duration for which the expanded signature is generated is typically a duration known by the AME to provide accurate monitoring of the media element. For example, the expanded signature can be generated for a particular percentage of the media element (e.g., 75% of the duration of the media element, etc.). The example media element analyzer 208 then determines whether the number of hits associated with the selected media element meets a threshold. In some examples, the threshold is determined as a required number of hits. In some such examples, the required number of hits may be determined by a user or administrator. In other examples, the threshold is determined to be a percentage of media elements in the preliminary signature database 120 having the highest number of hits (e.g., the media elements having the highest 10% of hits, etc.). In still other examples, the threshold is determined based on the media element having the highest number of hits. For example, the threshold may be set at 80% of the hits of the media element having the highest number of hits. If the number of hits associated with the media element meets the threshold, the media element is added to the example queue 210. In the illustrated example, the example queue 210 is a database that includes media elements that are to be added to the example reference database 118. On the other hand, if the media element does not meet the threshold, the media element selector 206 does not add it to the example queue 210 and selects a new media element to be analyzed.

When a media element from the preliminary signature database 120 has been added to an example queue 210, the example signature generator 204 generates an expanded signature for the media element held in the example queue 210. The expanded signatures and associated information are subsequently added to the example reference database 118. The process of selecting media elements in the preliminary signature database 120 and adding them to the reference database 118 can occur before, during, and after the generation of preliminary signature.

When the example audience measurement handler 116 has processed the signatures and/or other media monitoring information, it transmits processed information to the example reporting database 122, to which it is communicatively coupled. The example reporting database 122 stores information received from the audience measurement handler 116 used to generate reporting information associated with one or more media elements (e.g., a number of impressions, etc.).

While an example manner of implementing the example audience measurement handler 116 of FIG. 1 is illustrated in FIG. 2, one or more of the elements, processes and/or devices illustrated in FIG. 2 may be combined, divided, re-arranged, omitted, eliminated and/or implemented in any other way. Further, the example media identifier 202, the example signature generator 204, the example media element analyzer 208, the example media element selector 206, and/or, more generally, the example audience measurement handler 116 of FIGS. 1-2 may be implemented by hardware, software, firmware and/or any combination of hardware, software and/or firmware. Thus, for example, any of the example media identifier 202, the example signature generator 204, the example media element analyzer 208, the example media element selector 206 and/or, more generally, the example audience measurement handler 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media identifier 202, the example signature generator 204, the example media element analyzer 208, the example media element selector 206, and/or the example audience measurement handler 116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement handler 116 of FIGS. 1-2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
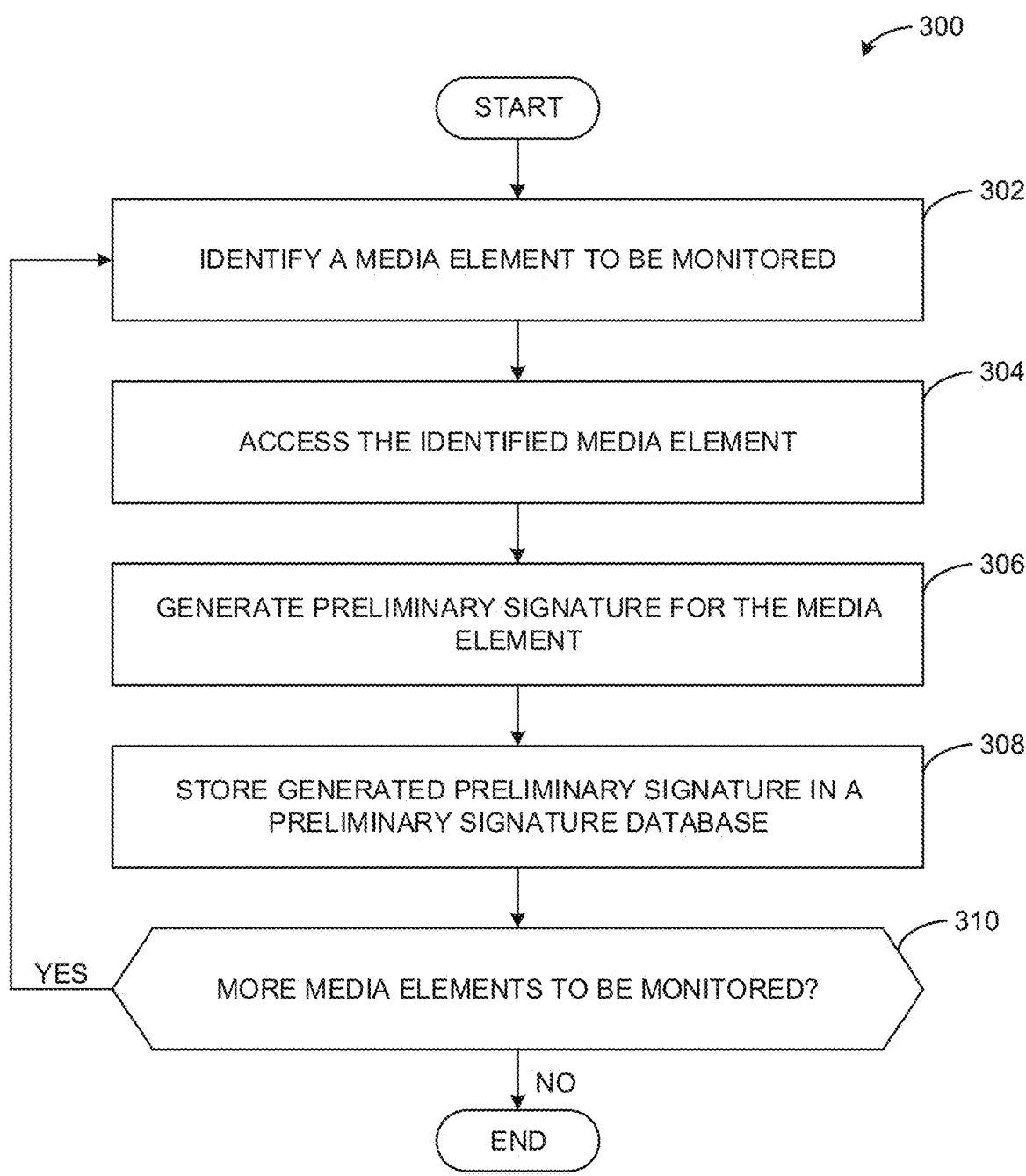
FIG. 3 is a flowchart representative of machine readable instructions which may be executed to implement the example audience measurement handler of FIGS. 1-2 to generate preliminary signatures for media elements.
Figure 4:
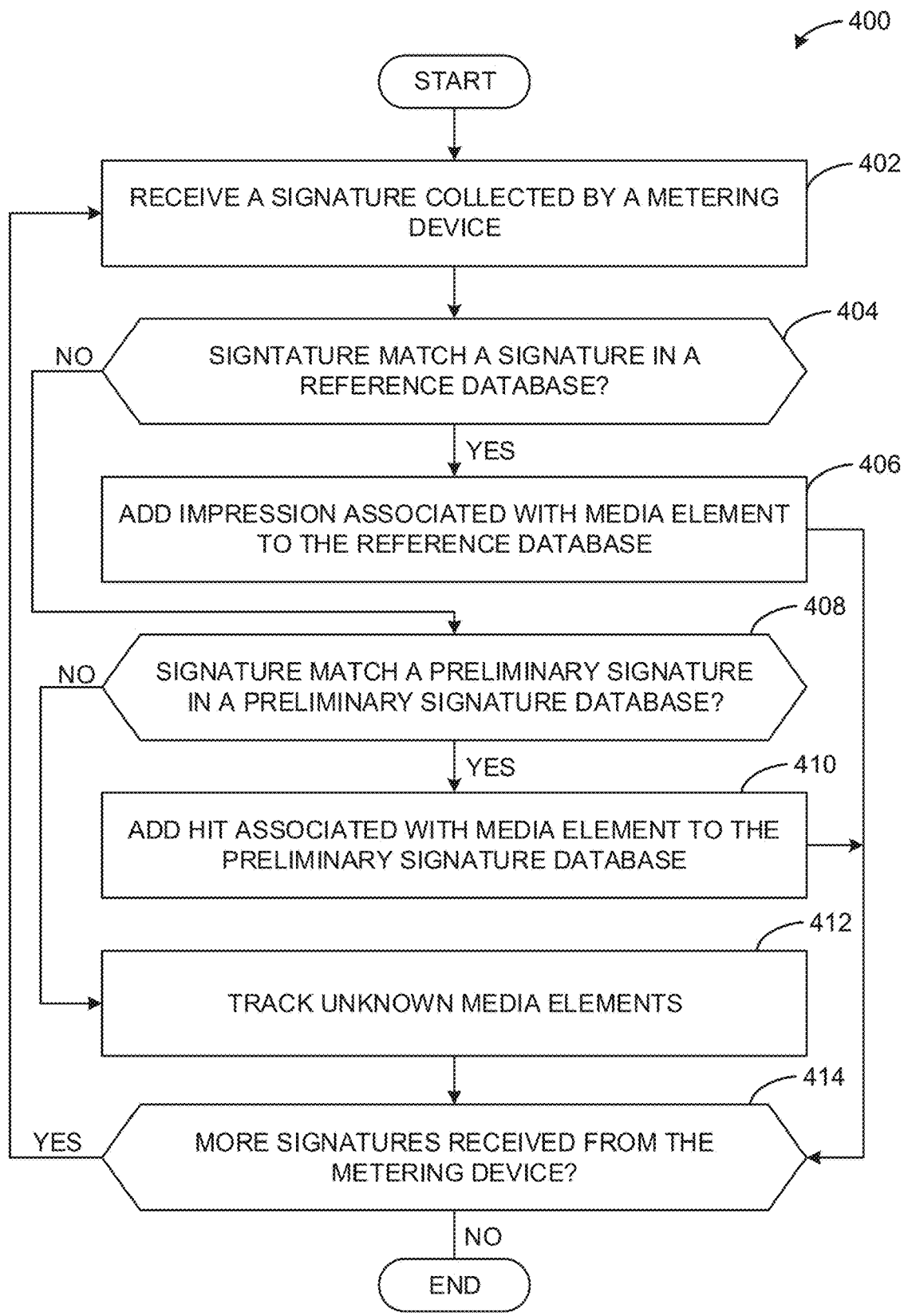
FIG. 4 is a flowchart representative of machine readable instructions which may be executed to implement the example audience measurement handler of FIGS. 1-2 to determine impressions and/or hits associated with media elements stored at the example central facility of FIG. 1.
Figure 5:
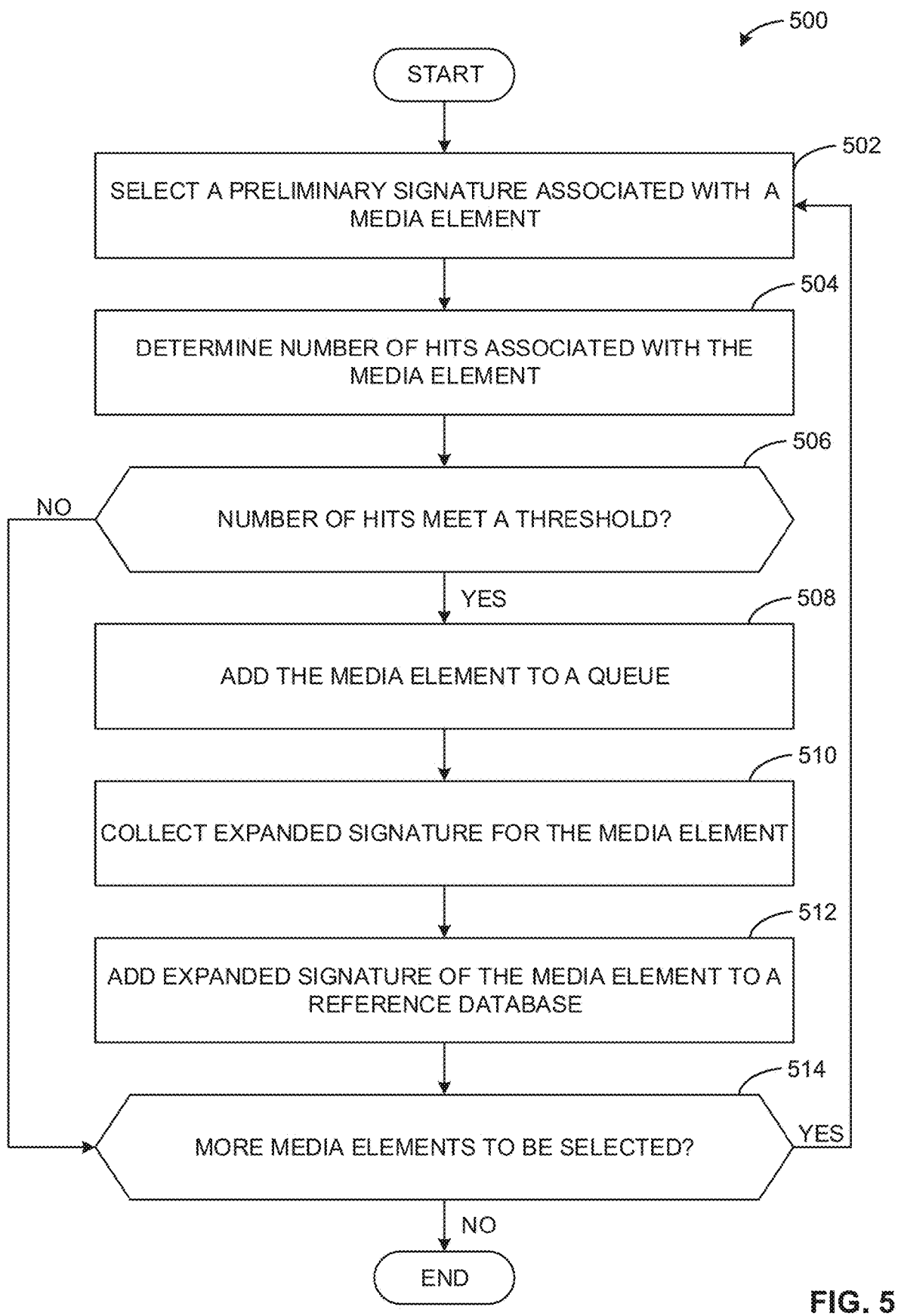
FIG. 5 is a flowchart representative of machine readable instructions which may be executed to implement the example audience measurement handler of FIGS. 1-2 to determine media elements to be added to the example reference database of FIG. 1.

A flowchart representative of example hardware logic, machine readable instructions, hardware implemented state machines, and/or any combination thereof for implementing the audience measurement handler 116 of FIGS. 1-2 is shown in FIGS. 3-5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example programs are described with reference to the flowcharts illustrated in FIGS. 3-5, many other methods of implementing the example audience measurement handler 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is a flowchart representative of machine readable instructions which may be executed to implement the example audience measurement handler 116 of FIGS. 1-2 to generate preliminary signatures for media elements. The example program 300 begins at block 302 where the example audience measurement handler 116 of FIGS. 1-2 identifies a media element to be monitored. For example, the example media identifier 202 of FIG. 2 identifies a media element from the example content provider 110 of FIG. 1 that is to be added to the example preliminary signature database 120 of FIG. 1. In some examples, the content provider interface 112 of FIG. 2 provides access to a media element or media elements included within the content provider 110, and the media identifier 202 of FIG. 2 identifies which of the media elements are to be monitored. In some examples, the media identifier 202 identifies media elements from a website that hosts OTT media elements (e.g., Youtube®, Hulu®, etc.). In some examples, the media identifier 202 identifies media elements of the website that are included in a most-viewed or top-ranked section. In some such examples, the media identifier 202 uses a web crawler to systematically index the content included in these sections and/or all media elements provided by the content provider 110. In some examples, the media identifier 202 identifies other types of media elements (e.g., Digital Versatile Discs (DVDs), television programs, etc.) to be included in the preliminary signature database 120.

At block 304, the audience measurement handler 116 accesses the identified media element. For example, the media identifier 202 of FIG. 2 accesses the source of the identified media element to determine information associated with the media element (e.g., a video title, an episode title, a uniform resource locator (URL), etc.). In some examples, the media element and the associated information is stored in the media database 212 of FIG. 2. In some examples, the information associated with the media element is used to identify the media element within a database (e.g., the preliminary signature database 120, the reference database 118, etc.) and facilitate future access to the media element.

At block 306, the audience measurement handler 116 generates a preliminary signature for the media element. For example, the signature generator 204 of FIG. 2 generates a preliminary signature (e.g., a signature generated for the first thirty seconds) of a portion of the media element identified by the media identifier 202. In some examples, the signature generator 204 generates a signature of the media element by accessing the URL of the media element and running a signature algorithm for a portion of the media elements. In some such examples, commercials included in the media element are removed prior to generating the signature.

At block 308, the audience measurement handler 116 stores the generated preliminary signature in a preliminary signature database. For example, the preliminary signature generated by the signature generator 204 is transmitted to the preliminary signature database 120 of FIG. 1. Further, the information associated with the media element (e.g., the title, URL, etc.) gathered by the example media identifier 202 of FIG. 2 are stored with the example preliminary signature in the preliminary signature database 120.

The example program 300 further determines whether more media elements are to be monitored at block 310. For example, the media identifier 202 identifies whether more media elements are to be monitored and stored in the preliminary signature database 120. When the media identifier 202 determines that more media elements are to be monitored, control of program 300 returns to block 302, where the example media identifier 202 begins the process of collecting information associated with the new media element. If, on the other hand, the example media identifier 202 determines that no more media elements are to be monitored, the example program 300 concludes.

FIG. 4 is a flowchart representative of machine readable instructions which may be executed to implement the example audience measurement handler 116 of FIGS. 1-2 to determine impressions and/or hits associated with media elements stored at the example central facility 102 of FIG. 2. The example program 400 begins at block 402 where the audience measurement handler 116 receives a signature collected by a metering device. For example, the audience measurement interface 114 receives signatures at the audience measurement handler 116 from the example panelist meter 106. The example panelist meter 106 collects signatures of media content (e.g., one or more media elements) and transmits the signatures, via a network (e.g., the example network 108 of FIG. 1), to the example audience measurement interface 114 of the example central facility 102. The example audience measurement interface 114 stores the received signatures in the example media database 212 of the example audience measurement handler 116.

At block 404, the audience measurement handler 116 determines whether the signature matches a signature in a reference database (e.g., the example reference database 118 of FIG. 1). For example, the signature received by the audience measurement interface 114 is stored in the media database 212 of FIG. 2. The example media element analyzer 208 compares the received signature to the signatures stored in the example reference database 118 and detects any matches that occur. In some examples, a match is determined based on a cross-correlation value, a Hamming distance, or other criteria used to determine a relationship between the received signature and a reference signature. When the example media element analyzer 208 determines that the received signature matches a signature stored in the example reference database 118, control of program 400 proceeds to block 406. If the example media element analyzer 208 determines that the received signature does not match a signature stored in the example reference database 118, control of program 400 proceeds to block 408.

At block 406, the audience measurement handler 116 adds an impression associated with the media element to the reference database. For example, when a match is detected by the media element analyzer 208 (block 404), the media element analyzer 208 adds an impression associated with the media element stored in the reference database. In some examples, the media element analyzer 208 stores the number of impressions of the media element in the reference database 118. The media element analyzer 208 updates the reference database 118 to reflect the number of impressions each time a new match is detected, thereby keeping an updated record of panelist consumption of the media element stored in the reference database 118. When the impression is added to the reference database 118 by the example media element analyzer 208, control of the example program 400 proceeds to block 414.

At block 408, the audience measurement handler 116 determines whether the signature matches a preliminary signature in a preliminary signature database (e.g., the example preliminary signature database 120 of FIG. 1). For example, the media element analyzer 208 of FIG. 2 compares a received signature (e.g., generated by the example panelist meter 106 of FIG. 1) stored in the media database 212 to the preliminary signatures stored within the preliminary signature database 120. The example media element analyzer 208 detects that a preliminary signature in the preliminary signature database 120 matches the received signature based on one or more criteria. For example, the media element analyzer 208 may determine whether there is a match based on a cross-correlation value, a Hamming distance, or other criteria used to determine a relationship between the received signature and a preliminary signature. When the media element analyzer 208 detects a match, control proceeds to block 410. If the media element analyzer 208 does not detect a match in the preliminary signature database 120, control of program 400 proceeds to block 412.

When the media element analyzer 208 matches the received signature to a preliminary signature in the preliminary signature database 120, the audience measurement handler 116 adds a hit associated with the media element to the preliminary signature database 120 (block 410). For example, the media element analyzer 208 adds a hit to the media element associated with the preliminary signature in the preliminary signature database 120. The example media element analyzer 208 continuously adds to the number of hits associated with each stored media element as more matches between preliminary signatures and received signatures are detected. In some examples, the media element analyzer 208 compares the monitored signature to the preliminary signatures in the preliminary signature database 120 prior to comparing the monitored signature to the signatures in the reference database 118. In other examples, the media element analyzer 208 compares the monitored signature to the signatures in the preliminary signature database 120 and the reference database 118 simultaneously.

At block 412, the audience measurement handler 116 tracks unknown media elements. For example, a signature of a monitored media element that does not match a signature stored in either the reference database 118 or the preliminary signature database 120 is unknown and/or previously unidentified by the example central facility 102 of FIG. 1. In such examples, the audience measurement handler 116 identifies the source of the media element, as described in more detail in connection with FIG. 2. In some examples, the previously unidentified media element is added to the example reference database 118 and/or the example preliminary signature database 120.

At block 414, the audience measurement handler 116 determines whether more signatures are received from the metering device (e.g., the example panelist meter 106 of FIG. 1). For example, the media identifier 202 determines whether the audience measurement handler 116 has received more signatures from the panelist meter 106 of FIG. 1. When the example media identifier 202 determines that more signatures have been received, control returns to block 402. When the example media identifier 202 determines that more signatures have not been received, the example program 400 concludes.

FIG. 5 is a flowchart representative of machine readable instructions which may be executed to implement the example audience measurement handler 116 of FIGS. 1-2 to determine media elements that are to be added to a reference database (e.g., the reference database 118 of FIGS. 1-2). The example program 500 begins at block 502 where the audience measurement handler 116 selects a preliminary signature associated with a media element. For example, the media element selector 206 of FIG. 2 selects a media element from the preliminary signature database 120 of FIG. 1 to determine whether a signature should be generated for the entire media element.

At block 504, the audience measurement handler 116 determines a number of hits associated with the media element selected in block 502. For example, the media element selected by the media element selector 206 is analyzed by the media element analyzer 208 to determine a total number of hits associated with the media element, as described in connection with FIG. 4.

Using the number of hits, the example audience measurement handler 116 determines whether the number of hits meets a threshold (block 506). For example, the media element analyzer 208 determines a threshold number of hits indicative of a level of consumption of the media element among panelists and/or consumers. In some examples, the threshold is set at a predetermined value by a user or administrator at the central facility 102 of FIG. 1. In some examples, the threshold is based on a relative number of hits between one or more media elements in the preliminary signature database 120 (e.g., the top 10% of the media elements having the most hits). In some other examples, the threshold is determined based on other criteria. When the number of hits exceeds the threshold, control proceeds to block 508. When the number of hits does not exceed the threshold, control proceeds to block 514.

At block 508, the example audience measurement handler 116 adds the media element to a queue. For example, the media element analyzer 208 stores the media element in the queue 210 of FIG. 2 when the number of hits associated with the media element exceeds the threshold. The example queue 210 is a database that includes media elements that are to be added to the example reference database 118. In other words, the example queue 210 stores the media elements during the transfer from the example preliminary signature database 120 to the example reference database 118.

At block 510, the example audience measurement handler 116 generates an expanded signature for the media element. For example, the signature generator 204 of FIG. 2 accesses the media element corresponding to the preliminary signature stored in the queue 210 and generates an expanded signature (e.g., a signature for the entire duration of the media element) for the media element. In some examples, the signature generator 204 accesses the media element using the URL information stored in the media database 212, removes any commercials included in the media element, and generates a signature using the same algorithm as was used for the other signatures stored in the reference database 118. Using the same algorithm for signature generation increases the correct matching between monitored signatures (e.g., by the example panelist meter 106 of FIG. 1) and signatures stored in the example preliminary signature database 120 and/or the example reference database 118.

At block 512, the example audience measurement handler 116 adds the expanded signature of the media element to a reference database. For example, the expanded signature generated by the signature generator 204 is transmitted to the reference database 118, and, once added to the reference database 118, is used to attribute impressions to media. Further information for the media element is associated with the media element and stored in the reference database. Once a new signature is added to the example reference database 118, accurate measurements of a number of impressions of the media can be collected.

At block 514, the example audience measurement handler 116 determines whether more media elements are to be selected. For example, the media element selector 206 determines whether more preliminary signatures stored in the preliminary signature database 120 are to be selected and potentially added to the reference database 118. When the example media element selector 206 determines that more media elements are to be selected and processed, control of the example program 500 returns to block 502. Conversely, if the media element selector determines that no more media elements are to be selected for the example program 500, the example program 500 concludes.

The example methods of FIGS. 3-5 can be executed simultaneously, independently, and/or consecutively. The methods disclosed herein operate to detect media previously not included in the example reference database 118, determine a number of hits and/or views of the media, and add media elements having sufficient views to the example reference database 118. Such methods prove especially useful for OTT media, as well as other forms of media that are not in a program lineup or other set schedule (e.g., movies on DVD, streaming media, etc.). By adding only the media elements meeting specified criteria, the wide variety and immense amount of OTT media, DVDs, etc. cab be streamlined to improve reference media used for crediting without a substantial change in storage requirements.

Figure 6:
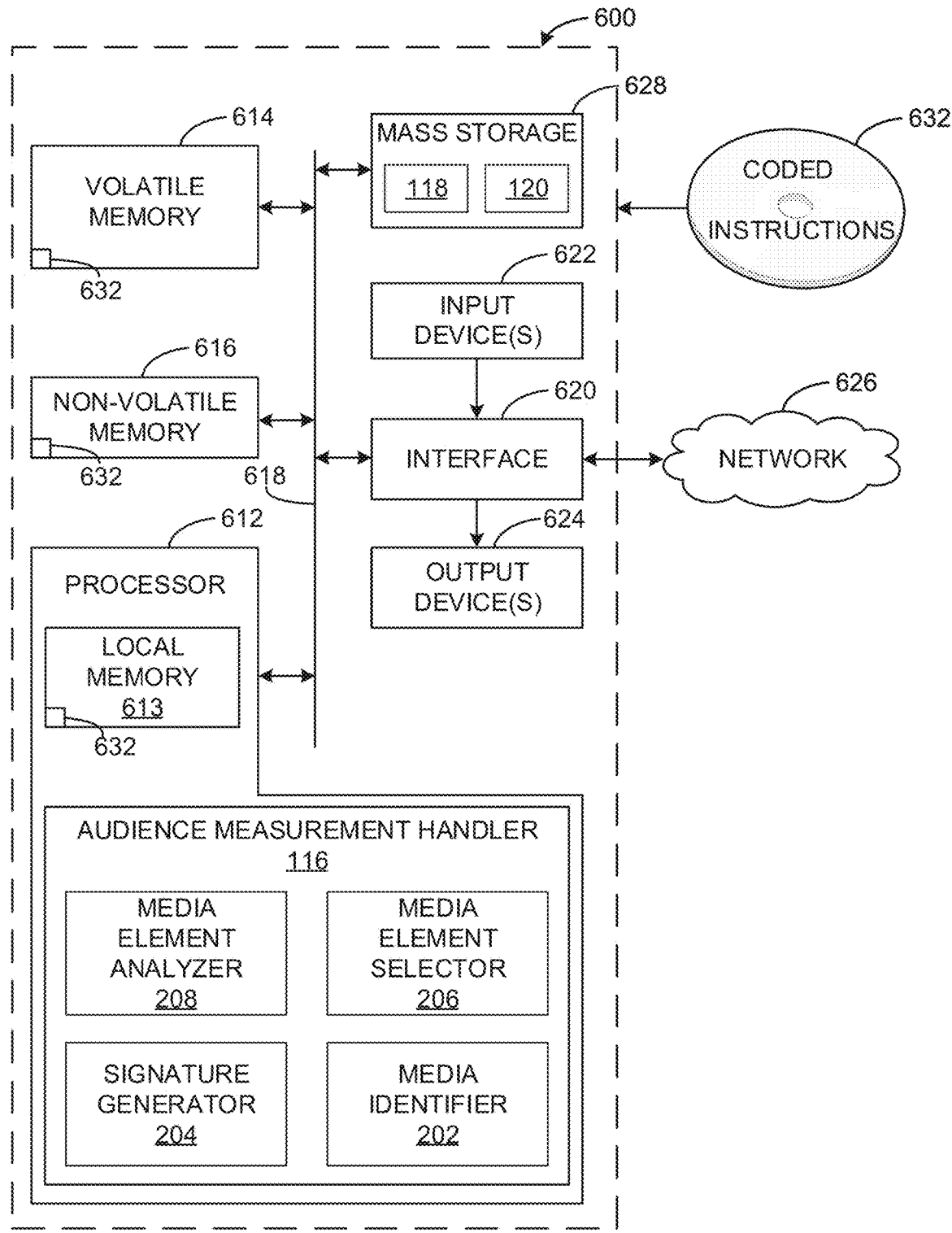
FIG. 6 is a block diagram of an example processor platform 600 structured to execute the instructions of FIGS. 3-5 to implement the apparatus of FIG. 2.

FIG. 6 is a block diagram of an example processor platform 600 structured to execute the instructions of FIGS. 3-5 to implement the audience measurement handler 116 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media identifier 202, the example signature generator 204, the example media element selector 206, and the example media element analyzer 208.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that increase a match rate for over-the-top media and/or other types of media that were previously unmatched. In some examples, preliminary signatures, which require less computational power to generate, are generated for a portion (e.g., a first thirty seconds) of the media element. In such examples, the media element reduces the storage required for the central facility and increases the computational efficiency of monitoring media (e.g., by determining numbers of views based on the shorter preliminary signature). In some examples disclosed herein, a media element is added to an example reference database when it is determined to be consumed at a high enough rate or by enough panelists. In such examples, expanded signatures are generated for only the media elements that meet particular criteria, which further reduces the storage requirements of an example central facility. In some examples, new media elements that were previously not monitored and/or credited (e.g., the number of impressions associated with the media elements was unknown) are added to the reference database. Thus, some examples disclosed herein increase the breadth media content included in crediting operations conducted by panelist meters (e.g., PPMs, on-site meters, etc.) without increasing the demands placed on the storage of the central facility. In such examples, OTT media that were previously difficult to monitor can be monitored using these panelist meters.

Although certain example methods and apparatus have been disclosed herein, the scope of coverage of this patent is not limited thereto. On the contrary, this patent covers all methods and apparatus fairly falling within the scope of the claims of this patent.

What is claimed is:
1. An apparatus comprising:
   a signature generator to generate a first signature of a first portion of a first media element, wherein the first signature is a preliminary signature;

an audience measurement interface to receive a second signature of media monitored by a panelist meter; and a media element analyzer to:
compare the first signature and the second signature;
determine a number of hits associated with the first media element based on the comparison; and
when the number of hits meets a threshold, generate a third signature for a second portion of the first media element, the second portion having a greater duration than the first portion of the first media element, wherein the third signature is an expanded version of the first signature.

2. The apparatus of claim 1, wherein the first media element is associated with over-the-top media.

3. The apparatus of claim 1, wherein the first portion of the first media element is the first thirty seconds of the first media element.

4. The apparatus of claim 1, further including a media identifier to identify, prior to generating the first signature, the first media element based on a number of impressions associated with the first media element on a website hosting the first media element.

5. The apparatus of claim 4, wherein the first media element is identified by a web crawler.

6. The apparatus of claim 1, wherein the media element analyzer determines a hit associated with the first media element by detecting when the second signature matches the first signature.

7. The apparatus of claim 1, further including a reference database to store the third signature, the third signature used to determine a number of impressions associated with monitored media elements.

8. A tangible, non-transitory computer readable storage medium comprising instructions that, when executed, cause a machine to at least:
generate, at a central facility, a first signature of a first portion of a first media element, wherein the first signature is a preliminary signature;
receive, at the central facility, a second signature from monitored media elements;
compare the second signature with the first signature;
determine a number of hits associated with the first media element based on the comparison; and
when the number of hits meets a threshold, generate, at the central facility, a third signature for a second portion of the first media element, the second portion having a greater duration than the first portion of the first media element, wherein the third signature is an expanded version of the first signature.

9. The tangible, non-transitory computer readable storage medium of claim 8, wherein the first media element is associated with over-the-top media.

10. The tangible, non-transitory computer readable storage medium of claim 8, wherein the first portion of the first media element is the first thirty seconds of the first media element.

11. The tangible, non-transitory computer readable storage medium of claim 8, wherein the instructions further cause the machine to identify the first media element prior to generating the first signature based on a number of impressions associated with the first media element on a website hosting the first media element.

12. The tangible, non-transitory computer readable storage medium of claim 11, wherein the first media element is identified by a web crawler.

13. The tangible, non-transitory computer readable storage medium of claim 8, wherein the instructions further causes the machine to store the third signature in a reference database as a reference signature, the third signature is used to determine a number of impressions associated with monitored media elements.

14. A method comprising:
generating, at a central facility, a first signature of a first portion of a first media element, wherein the first signature is a preliminary signature;
receiving, at the central facility, a second signature from monitored media elements;
comparing the second signature with the first signature;
determining a number of hits associated with the first media element based on the comparison; and
when the number of hits meets a threshold, generating, at the central facility, a third signature for a second portion of the first media element, the second portion having a greater duration than the first portion of the first media element, wherein the third signature is an expanded version of the first signature.

15. The method of claim 14, wherein the first media element is associated with over-the-top media.

16. The method of claim 14, wherein the first portion of the first media element is the first thirty seconds of the first media element.

17. The method of claim 14, further including identifying the first media element prior to generating the first signature based on a number of impressions associated with the first media element on a website hosting the first media element.

18. The method of claim 17, wherein the first media element is identified by a web crawler.

19. The method of claim 14, further including storing the third signature in a reference database as a reference signature, the third signature is used to determine a number of impressions associated with monitored media elements.

* * * * *